(12) United States Patent
Todd et al.

(10) Patent No.: US 6,246,549 B1
(45) Date of Patent: Jun. 12, 2001

(54) METHOD AND APPARATUS FOR REDUCING THE COUPLING OF THE REACTION FORCE FROM THE HEAD ACTUATOR INTO THE TRACK FOLLOW SERVO LOOP OF A MEDIA DRIVE

(75) Inventors: Christian Allen Todd, Thornton; Donovan Milo Janssen, Boulder; Lester Marvin Yeakley, Estes Park; Frank Goodknight, Niwot, all of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/274,407

(22) Filed: Mar. 23, 1999

(51) Int. Cl.⁷ ...................................................... G11B 5/55
(52) U.S. Cl. ......................................................... 360/266.4
(58) Field of Search .................. 360/261.1, 266.4–266.9

(56) References Cited

U.S. PATENT DOCUMENTS 5,416,658 * 5/1995 Sega et al. ............................ 360/106

FOREIGN PATENT DOCUMENTS

| 59-054077 | 3/1984 | (JP) . |
| 59-210577 | 11/1984 | (JP) . |
| 06-267206 | 9/1994 | (JP) . |

* cited by examiner

Primary Examiner—Robert S. Tupper
(74) Attorney, Agent, or Firm—Duft, Graziano & Forest

(57) ABSTRACT

The reaction force decoupling system, as implemented in a tape drive, reduces the motion that is coupled back into the tape cartridge from the reaction force that is generated by the operation of the read/write head actuator. The read/write head actuator consists of a magnet assembly which produces a large magnetic field in an annular gap and a coil of wire which operates freely in the magnetic field of the gap. The magnet assembly is mounted to the base of the drive and the coil is attached to the read/write head carriage. When current is applied to the coil, a force is produced between the coil and the magnet assembly to move the read/write head carriage. The magnet assembly is disconnected from the base of the drive and mounted on dual flexures arranged in a four bar linkage parallel guide arrangement. The reaction forces that are generated by the operation of the read/write head actuator must deflect the flexures to apply a load to the base of the drive. As the flexures are deflected, the magnet assembly is guided to remain coaxial with the coil. At low frequencies, the same reaction force is still applied to the base of the drive through this apparatus but above the resonant frequency of this apparatus, the reaction forces are attenuated with the result that the servo loop instability is reduced.

6 Claims, 4 Drawing Sheets

US 6,246,549 B1

METHOD AND APPARATUS FOR REDUCING THE COUPLING OF THE REACTION FORCE FROM THE HEAD ACTUATOR INTO THE TRACK FOLLOW SERVO LOOP OF A MEDIA DRIVE

FIELD OF THE INVENTION

This invention relates to media drives, such as tape drives that read and write data on a magnetic tape in more than one band, and in particular to the use of a servo controlled read/write head actuator for moving the read/write heads from band to band as well as for track following within each band to precisely align the read heads with the tracks of data that are written in a selected band on the magnetic tape.

Problem

It is a problem in the field of tape drives that read and write data on a magnetic tape in more than one band to have the write heads record adjacent tracks of data without overlapping and have the read heads accurately follow the previously written data tracks that are recorded on the magnetic tape. As the track density becomes higher, a track following servo is required to both keep the write heads from wandering into and writing over adjacent tracks and to keep the read tracks aligned to the written tracks on play back. In high performance tape drives with data written in more than one band, the servo controlled read/write head actuator is used for moving the read/write heads from band to band as well as for track following within each band. This arrangement requires a read/write head actuator that has a long stroke for moving the read/write heads between bands as well as high resolution and high bandwidth for precise track following within a selected band of tracks. These combined requirements result in a relatively massive read/write head carriage and a high performance read/write head actuator. In addition, as the read/write head is forced to follow servo tracks written on the tape, the reaction forces that are generated by this action are taken up by the base of the drive. These reaction forces can cause minute movements in the base of the drive, which movements can couple back to and cause motion in the tape cartridge in which the magnetic tape is housed. The motion of the tape cartridge impacts the operation of the track following servo loop in that the effects of the motion appear as broad band noise in the servo loop, which tends to excite any resonance or instability in the servo loop.

An example of a typical tape drive head adjustment apparatus is disclosed in U.S. Pat. No. 5,414,578 wherein a voice coil servo motor is provided for adjusting a magnetic tape head. This apparatus comprises a head positioning assembly that has a magnet housing and fixed suspension vertically positionable by a worm gear/screw shaft arrangement and is further positional for fine tuning by a magnet mounted within the magnet housing and an electrical coil surrounding the magnet and attached to a head mount structure holding the magnetic head. The head mount structure is fine-tuned, vertically positional with respect to the magnet housing by magnetic force on the coil induced by select and varying electrical current through the coil.

However, there are no systems that address the problem of servo noise induced by the read/write head actuator operation. More specifically, as the read/write head is forced to follow servo tracks written on the tape, reaction forces that are generated by this action are taken up by the base of the drive and coupled back to and cause motion in the tape cartridge.

Solution

The above described problems are solved and a technical advance achieved by the present method and apparatus for reducing the coupling of the reaction force from the read/write head actuator into the track follow servo loop of a media drive, termed "reaction force decoupling system" herein. This is accomplished in a tape drive by reducing the motion that is coupled back into the tape cartridge from the reaction force that is generated by the operation of the read/write head actuator. The read/write head actuator consists of a magnet assembly which produces a large magnetic field in an annular gap and a coil of wire which operates freely in the magnetic field of the gap. The magnet assembly is mounted to the base of the drive and the coil is attached to the read/write head carriage. When current is applied to the coil, a force is produced between the coil and the magnet assembly to move the read/write head carriage. The magnet assembly is disconnected from the base of the drive and mounted on dual flexures arranged in a four bar linkage parallel guide arrangement. The reaction forces that are generated by the operation of the read/write head actuator must deflect the flexures to apply a load to the base of the drive. As the flexures are deflected, the magnet assembly is also guided to remain coaxial with the coil. At low frequencies, the same reaction force is still applied to the base of the drive through this apparatus but above the resonant frequency of this apparatus, the reaction forces are attenuated with the result that the servo loop instability is reduced.

DETAILED DESCRIPTION

In the field of media drives, such as tape drives that read and write data on a magnetic tape in more than one band, the write heads must record adjacent tracks of data without overlapping and the read heads must accurately follow the previously written data tracks that are recorded on the magnetic tape. As the track density becomes higher, a track following servo is required to both keep the write heads from wandering into and writing over adjacent tracks and to keep the read heads aligned to the written tracks on play back. In high performance tape drives with data written in more than one band, a servo controlled read/write head actuator is used for moving the read/write heads from band to band as well as for track following within each band. This arrangement requires a read/write head actuator that has a long stroke for moving between bands as well as high resolution and high bandwidth for precise track following within a selected band of tracks.

Reaction Force Decoupling System Implementation

Figure 1:
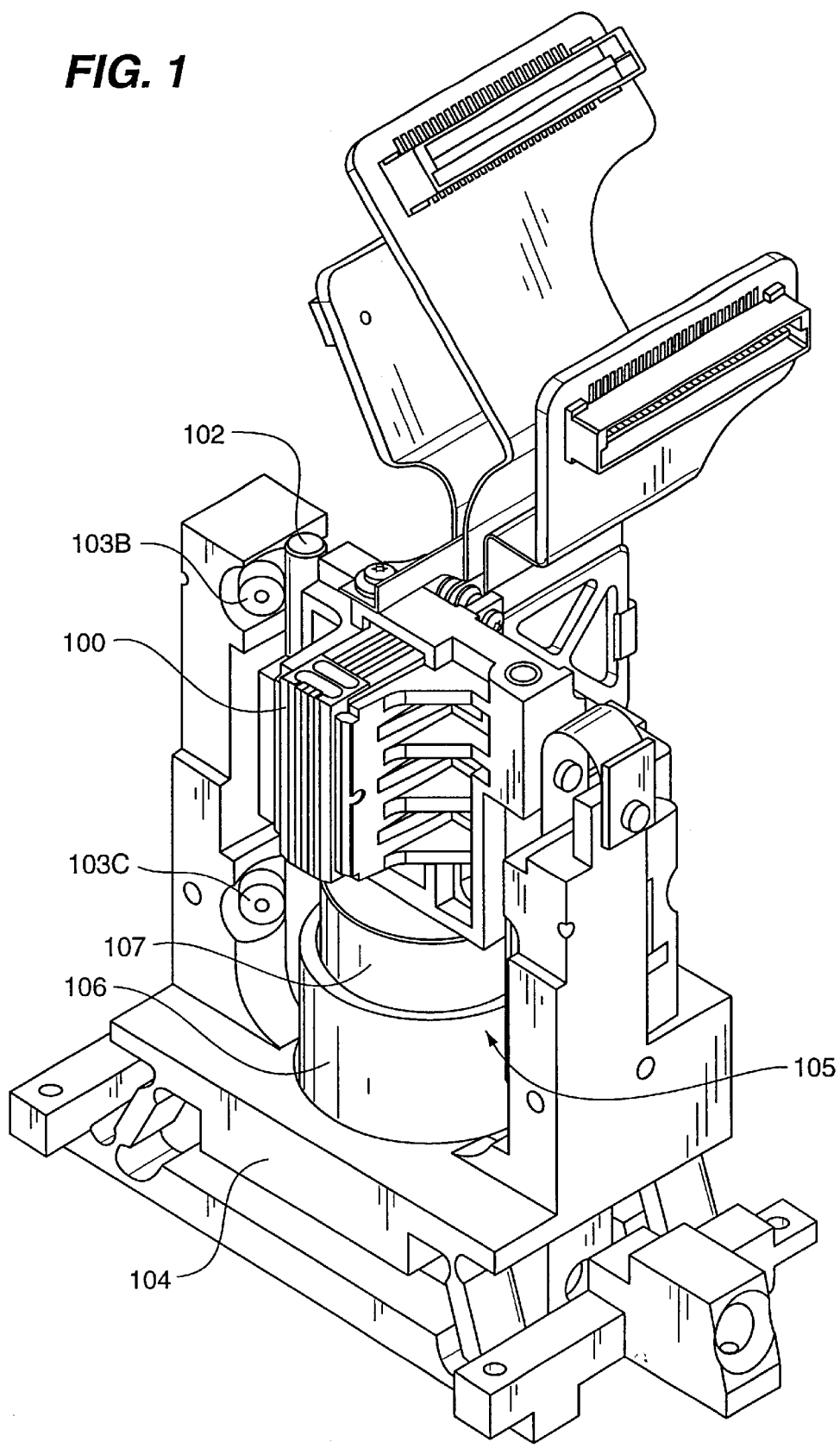
FIG. 1 illustrates a side perspective plan view of the present reaction force decoupling system.
Figure 2:
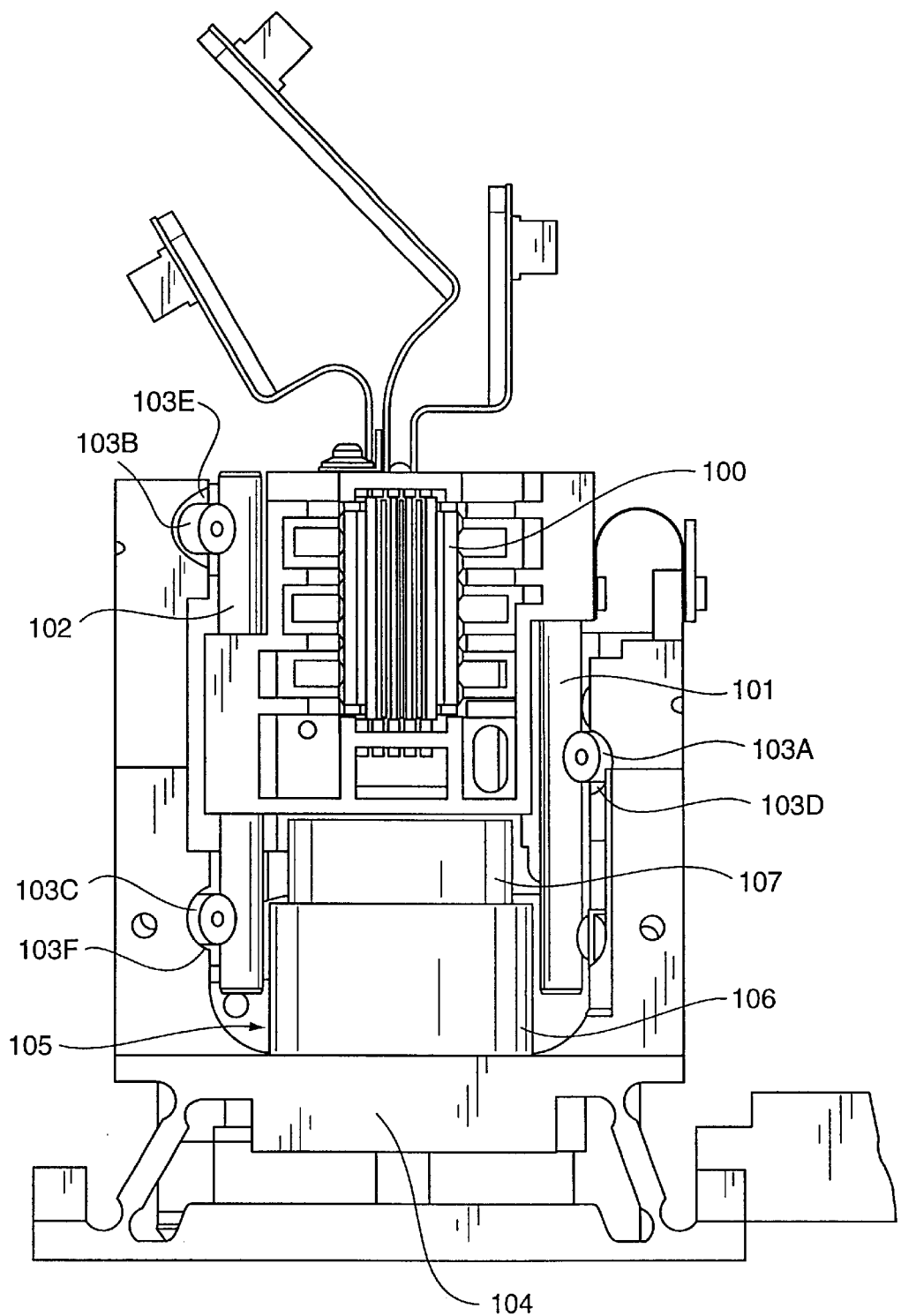
FIG. 2 illustrates a front view of the present reaction force decoupling system.

FIGS. 1–4 illustrate a side perspective plan view, a front view, a bottom perspective plan view, and a partial front cross-section view, respectively, of the present reaction force decoupling system as implemented in a read/write head apparatus in a tape drive. This system is also applicable to other media drives, and the use of a tape drive as the preferred embodiment is not intended to limit the scope of the inventions. The read/write head carriage 100 is guided by two rails 101, 102, which are part of the moving read/write carriage 100, and six roller bearings 103A–103F (one of which 103A is spring loaded) which are mounted to the base 104. Five 103B–103F of the roller bearings are preloaded by the one spring loaded roller bearing 103A. The roller bearings 103A–103F provide a rolling interconnection with the two rails 101, 102 to enable linear movement of the read/write head carriage 100 in the vertical direction as shown in FIGS. 1 and 2. The rolling interconnection is a low-friction coupling of the read/write head carriage 100 and the two rails 101, 102 to the base 104, and enables the linear movement of the read/write head carriage 100 with the application of a low level force.

Figure 3:
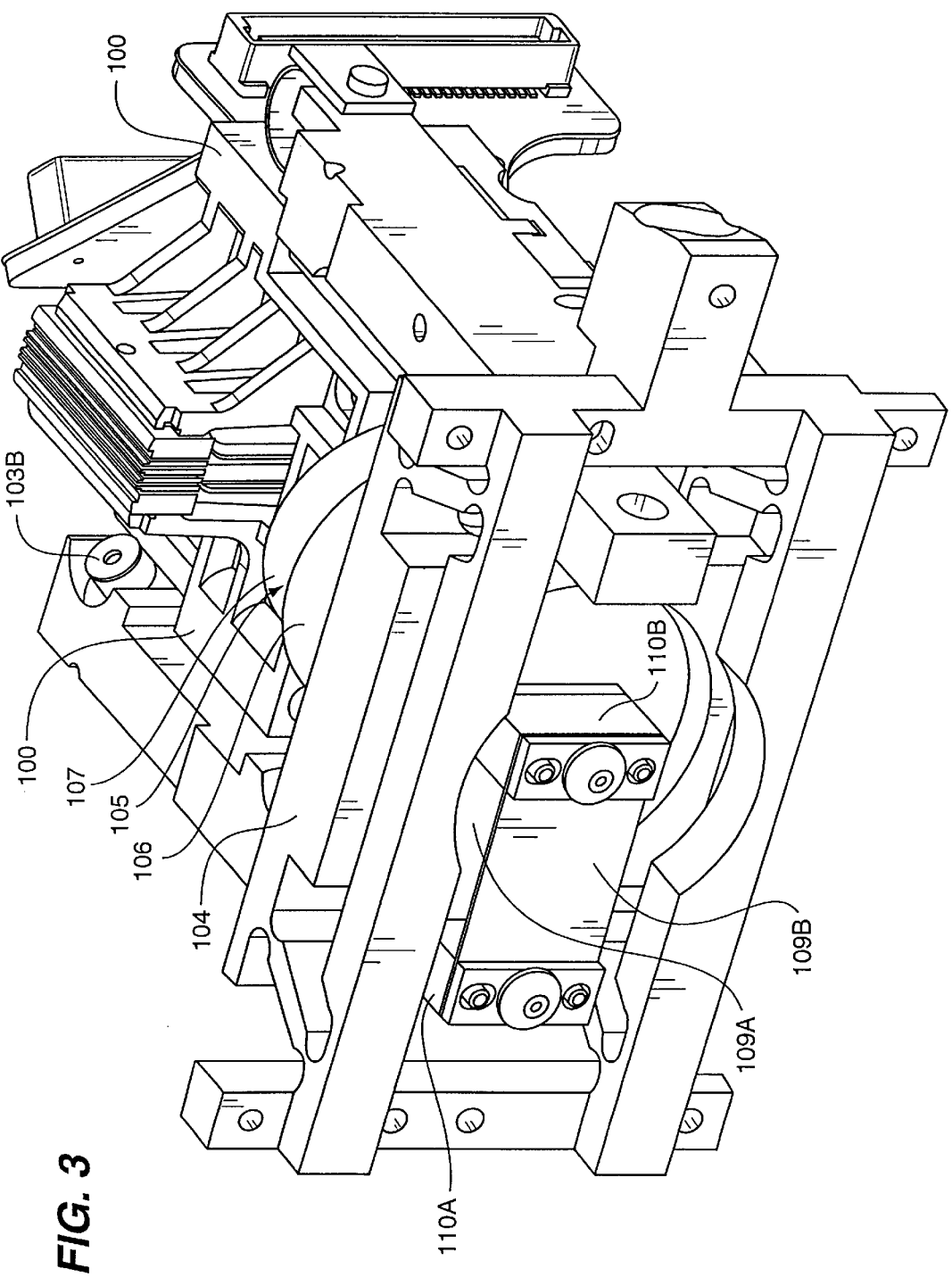
FIG. 3 illustrates a bottom perspective plan view of the present reaction force decoupling system.
Figure 4:
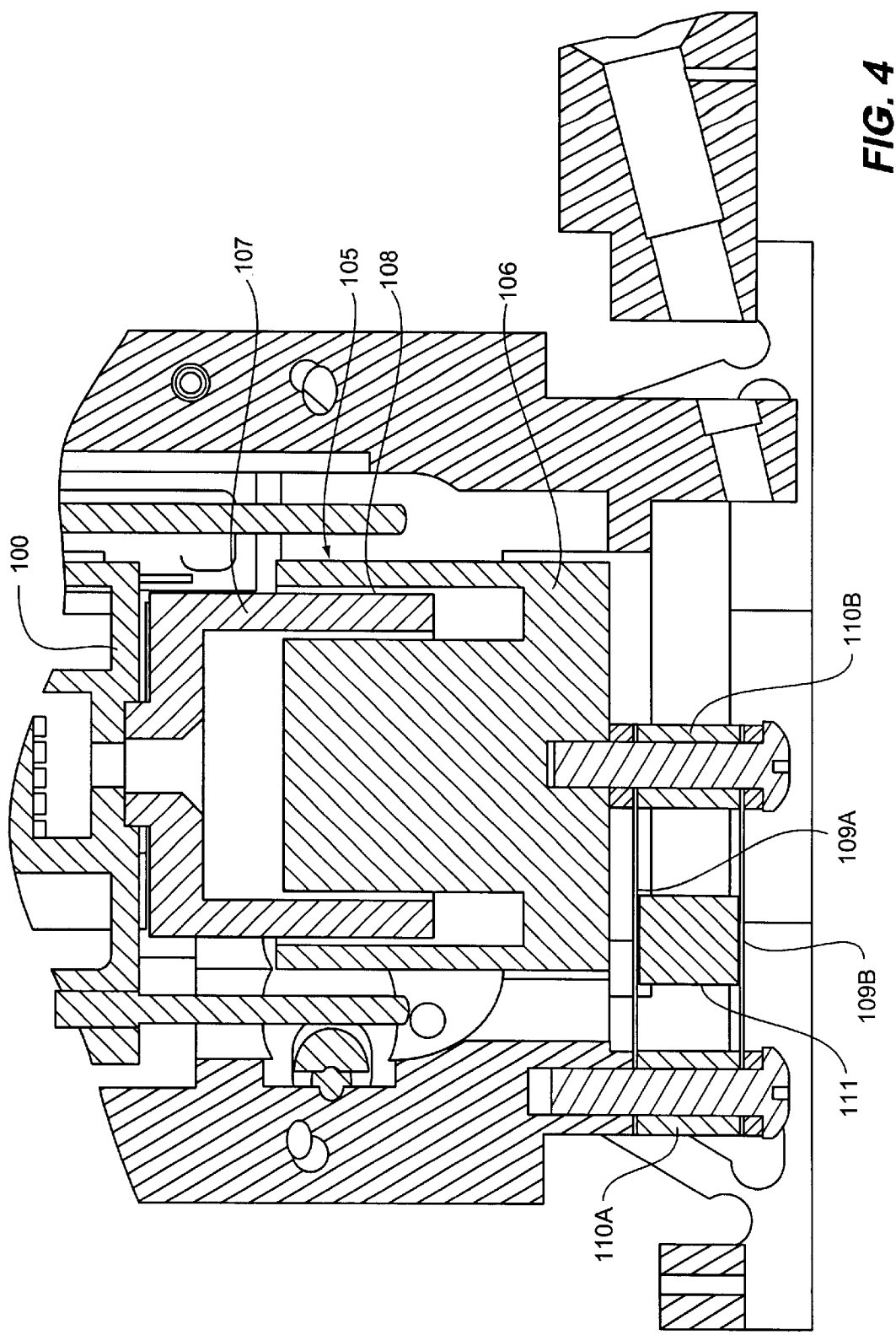
FIG. 4 illustrates a partial front cross-section view of the present reaction force decoupling system.

A voice coil linear motor 105 is used as the read/write head actuator. The voice coil linear motor 105 consists of a magnet assembly 106 which produces a large magnetic field in an annular gap 108 and a coil of wire 107 which operates freely in the magnetic field of the annular gap 108, as shown in FIG. 4. The magnet assembly 106 is mounted to the base 104 of the drive. The coil of wire 107 is attached to the read/write head carriage 100. When electrical current is applied to the coil of wire 107 of the voice coil linear motor 105, a force is produced between the coil of wire 107 and the magnet assembly 106 to move the read/write carriage 100 in a linear manner in the vertical direction as oriented in FIGS. 1 and 2. The reaction forces generated by the magnet assembly 106, as the coil of wire 107 is forced to follow servo tracks written on the magnetic tape (not shown), are taken up by the base 104 of the drive. These reaction forces can cause minute movements in the base 104, which can couple back to the tape cartridge. The motion of the tape cartridge appears as broad band noise in the servo loop which tends to excite any resonance or instability in the loop. The magnet assembly 106 is decoupled from the base 104 of the drive by being mounted on dual flexures 109A, 109B that are arranged in a four bar linkage parallel guide arrangement, as shown in FIGS. 3 and 4. The at least two interconnecting blocks 110A, 110B provide a predetermined separation between the dual flexures 109A, 109B and transmit force from the magnet assembly 106 to the base 104 via the dual flexures 109A, 109B in a force damping manner. The reaction forces that are generated by the operation of the read/write head carriage 100 must deflect the dual flexures 109A, 109B to apply a load to the base 104 of the drive. As the dual flexures 109A, 109B are deflected, they guide the magnet assembly 106 to remain substantially coaxial with the coil 107. At low frequencies, the same reaction force is still applied to the base 104 of the drive through this apparatus but above the resonant frequency of this apparatus, the reaction forces are attenuated with the result that the servo loop instability is reduced. The reaction force decoupling system can be chosen to produce a resonant frequency at a predetermined frequency by the proper selection of the size and material composition of the dual flexures 109A, 109B. The resonance of the magnet assembly 106 and flexure system can also be damped by applying a visco-elastic material 111 between the flexures 109A, 109B.

Summary

The magnet assembly is disconnected from the base of the drive and mounted on dual flexures arranged in a four bar linkage parallel guide arrangement. The reaction forces that are generated by the operation of the read/write head actuator must deflect the flexures to apply a load to the base of the drive. As the flexures are deflected, the magnet assembly is also guided to remain substantially coaxial with the coil due to the four bar arrangement of the flexure assembly. At low frequencies, the same reaction force is still applied to the base of the drive through this apparatus but above the resonant frequency of this apparatus, the reaction forces are attenuated with the result that the servo loop instability is reduced.

What is claimed:

1. A reaction force decoupling system for interconnecting a read/write head actuator with a base of a media drive, comprising:

at least two rail means attached to a read/write head carriage;

a plurality of bearing means, attached to said base, for providing a rolling interconnection with said at least two rail means to enable linear movement of said read/write head carriage;

said read/write head actuator comprising a magnet means and a coil means for controllably generating a linear force to produce said linear movement of said read/write head carriage;

dual flexure means connected to said base at a first end thereof and to said magnet means at a second end thereof for interconnecting said base and said magnet means to enable movement of said magnet means in a direction that is substantially collinear with said linear movement; and damping means for damping a resonance of said magnet means and said flexure means.

2. The reaction force decoupling system of claim 1 wherein said flexure means further comprises:

at least two interconnecting means for providing a predetermined separation between said dual flexures and for transmitting force from said magnet means to said base via said dual flexures in a force damping manner.

3. The reaction force decoupling system of claim 1 wherein said flexure means further comprises:

at least one visco-elastic means located between said dual flexures for damping resonance in said reaction force decoupling system.

4. A method of decoupling a reaction force produced by a read/write head actuator from a base of a media drive, wherein at least two rails are attached to a read/write head carriage and a plurality of bearings, attached to said base, provide a rolling interconnection with said at least two rails to enable linear movement of said read/write head carriage, said method comprising:

operating said read/write head actuator comprising a magnet and a coil for controllably generating a linear force to produce said linear movement of said read/write head carriage;

interconnecting said base and said magnet via a dual flexure apparatus which interconnects said base at a first end thereof and said magnet at a second end thereof to enable movement of said magnet in a direction that is substantially collinear with said linear movement; and damping a resonance of said magnet and said flexure apparatus.

5. The method of decoupling a reaction force of claim 4 wherein said step of interconnecting further comprises:

providing at least two interconnecting blocks to provide a predetermined separation between said dual flexures and for transmitting force from said magnet to said base via said dual flexures in a force damping manner.

6. The method of decoupling a reaction force of claim 4 wherein said step of interconnecting further comprises:

applying at least one visco-elastic element between said dual flexures for damping resonance in said reaction force decoupling system.

* * * * *